(12) United States Patent
Gold

(10) Patent No.: US 6,430,251 B1
(45) Date of Patent: Aug. 6, 2002

(54) 4-BIT POPULATION COUNT CIRCUIT

(75) Inventor: Spencer M. Gold, Pepperell, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 15 days.

(21) Appl. No.: 09/695,677

(22) Filed: Oct. 24, 2000

(51) Int. Cl.[7] .............................................. H03K 23/84
(52) U.S. Cl. ..................................... 377/127; 708/210
(58) Field of Search ............................... 708/210, 700; 712/210, 208, 211; 377/37, 39, 52, 127

(56) References Cited

U.S. PATENT DOCUMENTS 3,711,692 A * 1/1973 Batcher ...................... 708/210
4,189,716 A * 2/1980 Krambeck ................... 708/210
5,541,865 A * 7/1996 Ashkenazi ................... 708/210

* cited by examiner

Primary Examiner—Tuan T. Lam
(74) Attorney, Agent, or Firm—Lahive & Cockfield, LLP

(57) ABSTRACT

An electronic device that counts the number of set bits in an input vector and asserts an output vector representative of the number of set bits. The electronic device uses a combination of dynamic logic components and static logic components to minimize gate delay. The electronic device may be configured so that dynamic logic components are used to count set bits in the least significant portion of an input vector while static logic components count set bits in the most significant portion of an input vector. The electronic device may include circuitry for preventing a false assertion of an output due to leakage current.

20 Claims, 5 Drawing Sheets

4-BIT POPULATION COUNT CIRCUIT

TECHNICAL FIELD OF THE INVENTION

The present invention generally relates to semiconductor devices and more particularly, to an electronic counter for counting the number of set bits in a vector.

BACKGROUND OF THE INVENTION

In a microprocessor architecture that focuses on rapid and efficient processing of a relatively small set of simple instructions, such as a Reduced Instruction Set Computing (RISC) Architecture, it is often useful to determine the number of set bits in an input vector, namely, how many bits have a value of "1." Knowing the number of set bits in a vector allows a RISC microprocessor to bypass instructions or data in a register that does not have the required number of set bits. Consequently, the number of clock cycles necessary to process a fetch operation may be reduced.

Classically, a population count of set bits in a vector requires at least three full gate delays before a count is asserted. Although current microprocessor clock rates help to mitigate any loss of processing efficiency caused by a population count taking at least three full gate delays, the ultimate goal of any RISC microprocessor architecture is to optimize each and every instruction so that it can be completed within a single clock cycle. The burden of additional propagation delay in a counter circuit results in a RISC microprocessor design and architecture that is not optimized to carry out instructions in the least number of clock cycles possible.

SUMMARY OF THE INVENTION

The present invention addresses the above-described limitations of conventional population bit counter circuits that require at least three full gate delays to assert a count. The present invention provides an approach to enable an electronic population counter to assert a count of an input vector in less than three full gate delays.

In one embodiment of the present invention, a counter circuit is provided having a dynamic counting circuit adapted to count the number of set least significant bits in an input vector, and a second static counter circuit adapted to count the number of set most significant bits in the input vector. Further, the counter circuit provides an array of pass gates to combine the count of the dynamic counting circuit and the count of the static counting circuit and to assert a count of set bits in the input array.

The above-described approach benefits the RISC architecture of a microprocessor in that a population count of an input vector may be performed in less than three full gate delays. As a result, the RISC microprocessor may perform a population count instruction in a more efficient manner, thus decreasing required processing time.

In accordance with another aspect of the present invention, a method is performed in an electronic counter for counting a number of set bits in an input vector. The counter performs a count of the set least significant bits in the input array using dynamic logic components and performs a count of the set most significant bits in the input vector using static logic gates. The static logic elements assert a count to an array of pass transistors before the dynamic logic elements assert their count to the array of pass transistors. As a result, a count corresponding to the number of set bits in an input vector is asserted in less than three full gate delays.

BRIEF DESCRIPTION OF THE DRAWINGS

An illustrative embodiment of the present invention will be described below relative to the following drawings.

DESCRIPTION OF ILLUSTRATED EMBODIMENT

The illustrative embodiment of the present invention provides a semiconductor device for optimizing the count of set bits in a vector. In the illustrative embodiment, a first counting device of dynamic logic elements is adapted for counting the number of set bits in the least significant portion of an input vector and a second counting device of static logic elements is adapted for counting the number of set bits in the most significant portion of the input vector. Each device asserts their respective count to an array of pass gates that combine the two counts and assert a count of set bits in the input vector. The semiconductor device utilizes a clock pulse to precharge the output nodes of the array of pass gates and the dynamic logical elements. Moreover, the static logic elements are configured to assert an output in one gate delay. The output nodes of the static logic elements are adapted to be in circuit with a discrete row of pass transistors. As such, the array of pass gates is configured so that the static logic elements control the gate portion of each transistor. In this manner, the pass gates are fully open when the dynamic logic elements assert an output. Because the combinational array of pass gates are on before the dynamic logic elements assert an output, a set bit count of an input vector may be performed in less than three full gate delays.

For purposes of the discussion below it is helpful to clarify the meaning of the phrase "gate delay". A "gate delay" refers to the amount of time required for a waveform to travel from the input of a gate to the output of a gate as measured from the 50% point of the leading edge of the input waveform and the 50% point of the falling edge of the output waveform.

In the illustrative embodiment, the semiconductor device is attractive for use in microprocessors employing a Reduced Instruction Set Computing (RISC) architecture. This semiconductor device allows an instruction concerning the operation of bit field data such as, writing the number of set bits in a source register into a target register, finding a first bit set in a register, cryptography analysis, algorithm execution, or the like, to be processed in a faster and more efficient manner. The reduction in gate delay provided by the illustrative embodiment facilitates the reduction of instruction processing time that results in more instructions carried out per second of time in a microprocessor.

Figure 1:
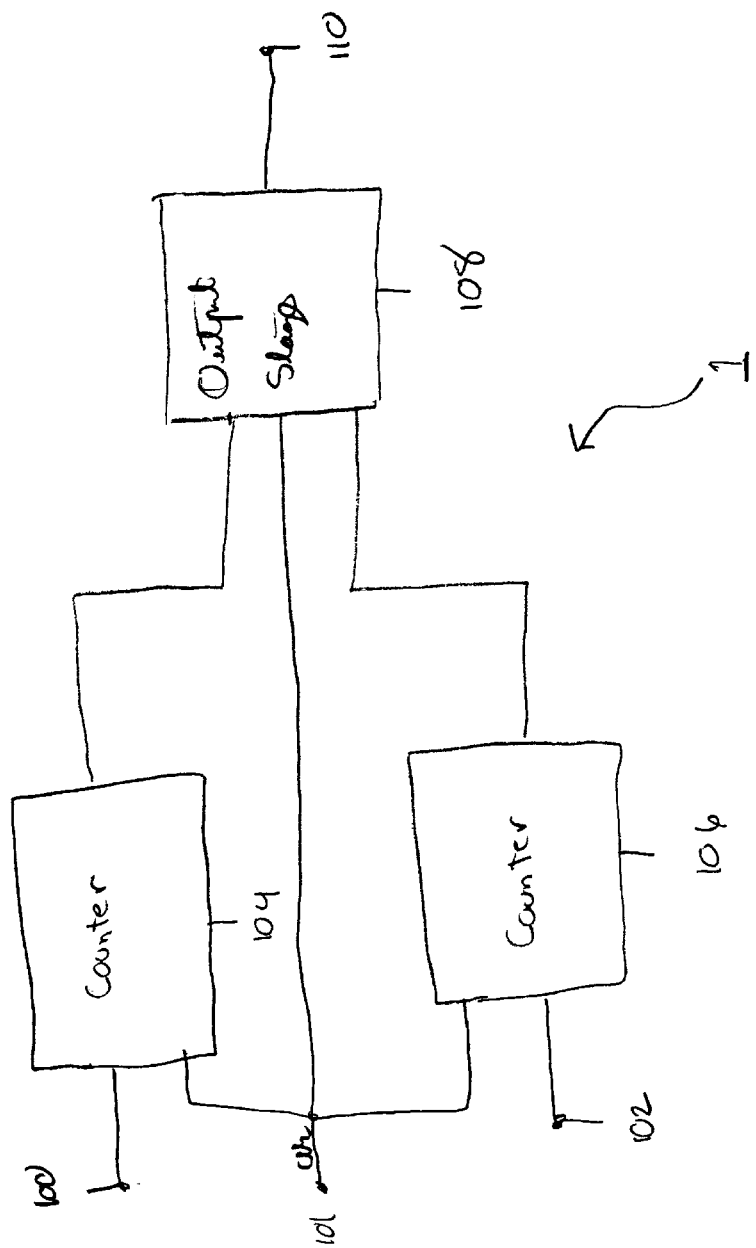
FIG. 1 depicts a block diagram of a counter circuit suitable for practicing the illustrative embodiment of the present invention.

FIG. 1 is a block diagram of an example semiconductor device 1 that is suitable for practicing the illustrative embodiment of the present invention. The semiconductor device 1 has an input 100 for receiving the least significant bits and their complements of an input vector and a second input node 102 adapted for receiving the most significant bits and their complements of the input vector. A clock pulse enters at node 101 and provides the necessary clock pulse to counter 104, counter 106, and output stage 108. Counter 104 provides a 2-bit count of the least significant bits in the input vector in one gate delay and counter 106 provides a 2-bit count of the most significant bits in the input vector in one gate delay. Output stage 108 combines the 2-bit population count from counter 104 and the 2-bit population count from counter 106 and asserts the population count of the input vector at node 110 in less than one gate delay.

Those skilled in the art will appreciate that the depiction of counter 104, counter 106, and output stage 108 in FIG. 1 is intended to be merely illustrative and not limiting of the present invention. The illustrative embodiment of the present invention presumes that the input vector contain four bits, however, the input vector may have more bits (e.g., 32 or 64) in some instances and in other instances less than four bits. As will be described in more detail below, counter 104 is presumed to have characteristics from one or more dynamic logic families, while counter 106 is presumed to have characteristics from one or more static logic families. Output stage 108 is presumed to have electrical characteristics found in pass transistors or pass gate logic families. The transistors depicted in FIGS. 2–5 are from the metal oxide semiconductor field effect transistor (MOSFET) family of transistors, which includes P channel MOSFETs, also referred to as PMOS transistors, N channel MOSFETs also referred to a s NMOS transistors, and Complementary Symmetry MOSFET also referred to as CMOS transistors. Nevertheless, those skilled in the art will appreciate that the present invention may be practiced with counter 106 having the characteristics of a dynamic logic family.

Figure 2:
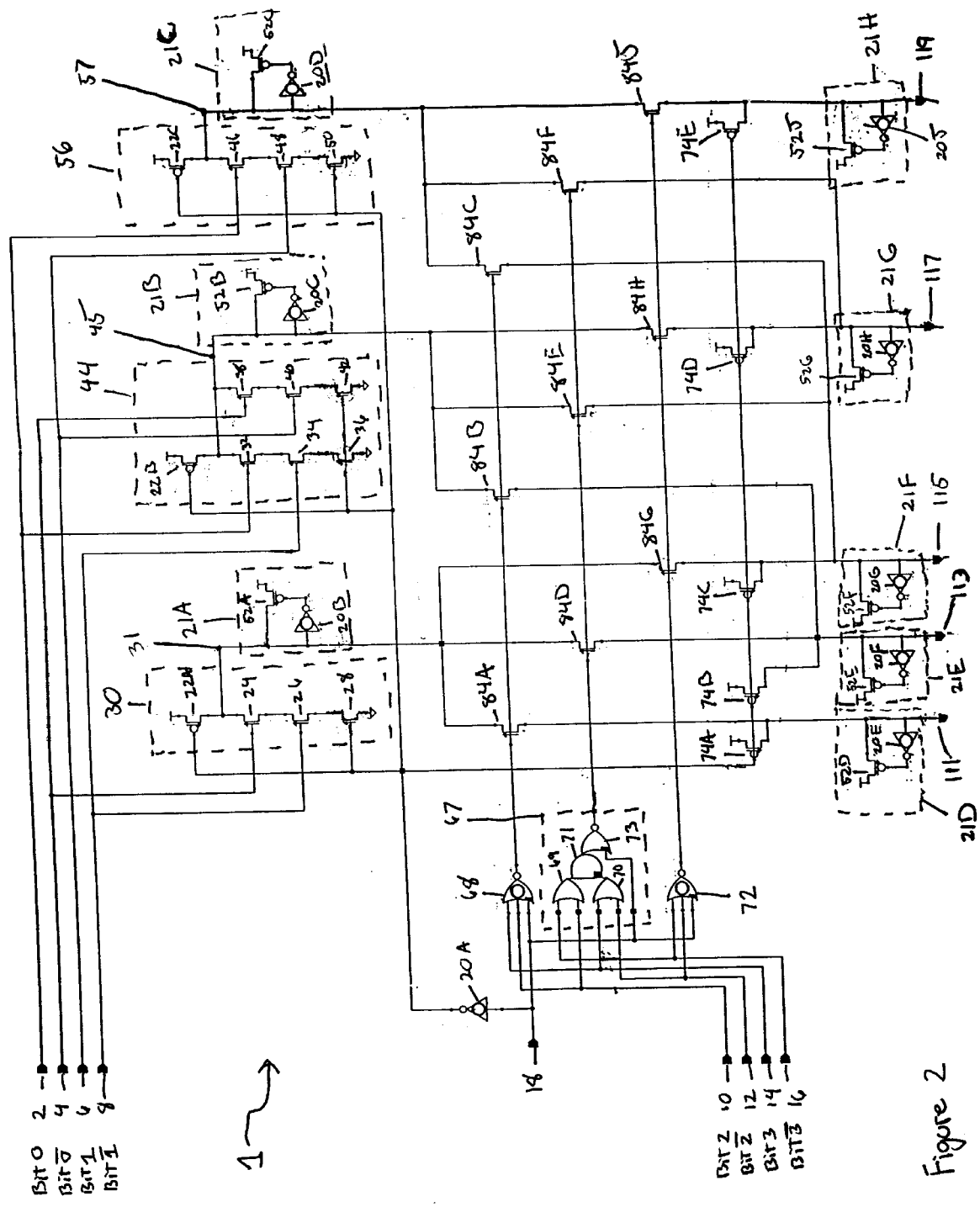
FIG. 2 depicts an electrical circuit that is suitable for implementing the population counter of the illustrative embodiment.

With reference to FIGS. 1 and 2, an electronic device suitable for performing a population count in less than three full gate delays is illustrated by FIG. 2. Semiconductor device 1 includes a set of input nodes that correspond to each bit in the input vector and to each bit's corresponding complement. In the illustrative embodiment of the present invention, input node 2 is adapted to receive the least significant bit in the input vector and input node 4 is adapted to receive its complement. Input node 6 is adapted to receive the one bit of the input vector and input node 8 is adapted to receive tits complement. Continuing in weighted bit sequence of a digital input vector, input node 10 is adapted to receive the two bit of the input vector while input node 12 is adapted to receive its complement. Finally, input node 14 is adapted to receive the most significant bit or the three bit in the input vector with input node 16 being adapted to receive its complement. Those skilled in the art will appreciate that other input node configurations and/or assignments may be used without imparting additional gate delay as practiced in the present invention. Moreover, input node 18 is adapted to receive the clock signal necessary to synchronize semiconductor device 1.

Input node of inverter 20A is in circuit with input node 18 to provide the necessary logic level for the precharge phase, or memory phase of the electronic device 1. Inverter 20A inverts the clock pulse from a high logic level to a low logic level so that the precharge phase, or the memory phase of the various dynamic nodes in electronic device 1 occur during the high portion of the clock pulse and that the evaluate phase of the dynamic nodes occurs during the low portion of the clock pulse. Those skilled in the art will appreciate and observe that electronic device 1 may be modified to reverse the memory phase and the evaluate phase of the dynamic nodes so that the memory phase occurs during the low portion of the clock cycle at input node 18 and the evaluate phase occurs during the high portion of the clock cycle at input note 18. The output node of inverter 20A is tied to the inverted gates of precharge transistors 22A, 22B, and 22C. Precharge transistors 22A, 22B, and 22C are adapted to lead the output nodes of counter 104 to a known state when the clock pulse at input node 18 is at a high logic level. The output node of inverter 20A is also coupled to the inverted gates of pre-charge transistors 74A, 74B, 74C, 74D, and 74E that pre-charge the output nodes of output stage 108 to a known state when the clock pulse at input node 18 is at a high logic level.

Dynamic counter 104 is adapted to have a dynamic circuit 30, a dynamic circuit 44, and a dynamic circuit 56. Those skilled in the art will appreciate that additional dynamic circuits may be added or additional discrete elements may be added to the depicted dynamic circuits as required by the number of bits in an input vector and that the arrangement or physical layout of circuits 30, 44, and 56 may take different physical shapes, locations, or structures without departing from the embodiments of the present invention.

Dynamic circuit 30 includes four serially connected transistors 22A, 24, 26 and 28 adapted to assert a 2-bit population count that indicates whether the least significant portion of the input vector contains no set bits. That is, serially connected transistors, 22A, 24, 26 and 28 perform a logical NAND operation during the evaluate phase on input 1 node 4 and input node 8. The serially connected transistors of dynamic circuit 30 are adapted to have a PMOS precharge transistor 22A with an inverted gate in circuit with t he output of inverter 20A. The source of transistor 22A is coupled to a voltage source supplying a high level logic signal while the drain is coupled to both the output node of dynamic circuit 30 and the drain of NMOS transistor 24. NMOS transistor 24 has its source in circuit with the drain of NMOS transistor 26 and its gate in circuit with input node 4. NMOS transistor 26 has its gate in circuit with input node 8 and its source in circuit with the drain of NMOS transistor 28. NMOS transistor 28 has its gate in circuit with the output of inverter 20A and its source in circuit with ground.

The output node 31 of dynamic circuit 30 is in circuit with an optional keeper circuit 21A that helps maintain the desired logic state asserted by dynamic circuit 30 by preventing any false assertions caused by leakage current. Keeper circuit 21A includes an inverter 20B having its input in circuit with the output node 31 of dynamic circuit 30 and its output node in circuit with the inverted gate of a PMOS transistor 52A. PMOS transistor 52A has its source tied to a voltage source supplying a high level logic signal and its drain coupled to the output node 31 of dynamic circuit 30. As illustrated in FIG. 2, dynamic circuit 30 asserts an output when the clock signal at node 18 is at a low logic level. Those skilled in the art will appreciate that dynamic circuit 30 may be modified to assert an output when the clock signal at node 18 is at a high logic level.

Dynamic circuit 44 asserts a count that indicates whether one bit is set in the least significant portion of the input vector when the clock pulse at node 18 is at a low logic level. Dynamic circuit 44 includes two sets of serially connected transistors connected in parallel between the output node 45 of dynamic circuit 44 and the output of inverter 20A. In operation, dynamic circuit 44 performs a 2-bit population count on the least significant bits and their complements in the least significant portion of the input vector and asserts an output that indicates whether one bit is set in the least significant portion of the vector. That is, serially connected transistors 22B, 32, 34 and 36 perform a logical NAND operation on input node 2 and input node 8 during the evaluation phase of the clock cycle, while serially connected transistors 38, 40, and 42 perform a logical NAND operation or input node 4 and input node 6 during the same evaluation phase. Because serially connected transistors 22B, 32, 34 and 36 are connected in parallel with serially connected transistors 38, 40, and 42, their common output node 45 will assert a low level logic signal should either logical NAND operation assert a logical "0."

Dynamic circuit 44 includes a pre-charge PMOS transistor 22B having its source in circuit with a voltage source that asserts a high level logic signal. The inverted gate is coupled to the output of inverter 20A, the drain is in circuit with both the output node 45 of dynamic circuit 44 and is tied to the drain of NMOS transistor 32. The gate of NMOS transistor 32 is tied to the input node 2 and the source of transistor 32 is in circuit with the drain of NMOS transistor 34. NMOS transistor 34 has its gate in circuit with input node 8 and its source in circuit with the drain of NMOS transistor 36. NMOS transistor 36 has its gate in circuit with the output node of inverter 20A, and the gate of transistor 22B, and the source of transistor 42 is tied to ground. Dynamic circuit 44 also includes NMOS transistor 38 having its drain in circuit with the drain of NMOS transistor 32 and the drain of PMOS transistor 22B, its gate in circuit with input node 4, and its source in circuit with the drain of NMOS transistor 40. NMOS transistor 40 has its gate in circuit with input node 6 and its source in circuit with the drain of NMOS transistor 42. NMOS transistor 42 has its gate in circuit with the output node of inverter 20A, the gate of transistor 22B, and its source tied to ground. In this configuration PMOS transistor 22B pre-charges the output node 45 of dynamic circuit 44 to a high logic level when the clock pulse is at a high logic level at input node 18. Dynamic circuit 44 asserts its count when the clock pulse at input node 18 is at a low logic level.

In an alternative embodiment of the present invention, NMOS transistor 28, 36, 42, and 50 may be replaced by a signal NMOS transistor (not shown) having its gate in circuit with the output of inverter 20A its source connected to ground and its drain in circuit with the source of NMOS transistors 26, 34, 40, and 48. This alternative embodiment provides the benefit of a design requiring fewer discreet components while providing an increase in operational speed. The use of a single transistor in place of NMOS 28, 36, 42, and 50 does not alter the logical functionality of dynamic circuit 30, dynamic circuit 44, or dynamic circuit 56.

An optional keeper circuit 21B is associated with the output node 45 of dynamic circuit 44 to help maintain a desired logic level on the output node 45 by preventing any false assertions due to leakage current. Keeper circuit 21B includes an inverter 20C having its input in circuit with the output node 45 of dynamic circuit 44, and its output in circuit with the inverted gate of PMOS transistor 52B. PMOS transistor 52B has its source in circuit with a voltage source asserting a high level logic signal and has its drain in circuit with the output node 45 of dynamic circuit 44.

Dynamic circuit 56 operates to assert a 2-bit population count that indicates whether all of the least significant bits in the input vector are set. Dynamic circuit 56 operates to pre-charge its output when the clock pulse at input node 18 is high and asserts its count at output node 57 when the clock pulse at input node 18 is low. One skilled in the art will appreciate that dynamic circuits 30, 44 and 56 may be modified to reverse the pre-charge phase and the evaluation phase. In operation, serially connected transistors 22C, 46,48, and 50 perform a logical NAND operation on input node 2 and input node 6 during the evaluation phase of the clock cycle.

Dynamic circuit 56 includes a pre-charge PMOS transistor 22C having its source in circuit with a voltage source supplying a high level logic signal, an inverted gate in circuit with the output of inverter 20A, its drain in circuit with the drain of NMOS transistor 46 and the output node 57 of dynamic circuit 56. NMOS transistor 46 has its gate in circuit with input node 2 and its source in circuit with the drain of NMOS transistor 48. NMOS transistor 48 has its gate in circuit with input node 6 and its source in circuit with the drain of NMOS transistor 50. NMOS transistor 50 has its source tied to ground, its gate in circuit with the output node of inverter 20A and the gate of transistor 22C.

Attached to the output node 57 of dynamic circuit 56 is optional keeper circuit 21C. The keeper circuit 21C helps maintain a desired logic state on output node 57 by preventing false assertions of an output due to leakage current from dynamic circuit 56. Keeper circuit 21 C includes an inverter 20D having its input tied to the output node 57 of dynamic circuit 56 and its output tied to the inverted gate of PMOS transistor 52C. PMOS transistor 52C has its source in circuit with a voltage source asserting a high level logic signal and its drain in circuit with the output node 57 of dynamic circuit 56.

Counter circuit 106 of FIG. 1, includes a NOR gate 68 for asserting a count that indicates whether there are no set bits in the most significant bit portion of an input vector, a static counting circuit 67 for asserting a count that indicates one set bit amongst the most significant bits, and a third counter represented by NOR gate 72 that asserts a count that indicates whether all of the most significant bits in input vector are set. In the illustrative embodiment of the present invention, NOR gate 68 and NOR gate 72 are three input NOR gates. Those skilled in the art will appreciate that the number of NOR gate inputs may be increased to accommodate the number of bits in a register or an input vector. The discrete elements forming NOR gates 68 and 72, and counter circuit 67 will be discussed in more detail below.

With reference to FIG. 2, NOR gate 68 has a first input in circuit with input node 14, a second input in circuit with input node 10, and a third input in circuit with input node 18. The output of NOR gate 68 is in circuit with the gate of NMOS transistor 84A, the gate of NMOS transistor 84B, and the gate of NMOS transistor 84C.

Counter circuit 67 includes OR gate 69 having its first input in circuit with input node 16 and its second input in circuit with input node 10 and its output node in circuit with a first input of AND gate 71. Counter circuit 67 also includes OR gate 70 with one input in circuit with input node 14, its second input in circuit with input node 12, and having its output in circuit with the second input of AND gate 71. AND gate 71 has its output in circuit with a first input of NOR gate 73. NOR gate 73 has its second input in circuit with input node 18 and its output node in circuit with the gate of NMOS transistor 84D, the gate of NMOS transistor 84E, and the gate NMOS transistor 84F.

NOR gate 72 has a first input in circuit with input node 16, a second input in circuit with input node 12, and a third input in circuit with input node 18. NOR gate 72 has its output in circuit with the gate of NMOS transistor 84G, the gate of NMOS transistor 84H, and the gate of NMOS transistor 84J. Those skilled in the art will appreciate that the logic functions represented by NOR gates 68 and 72 and the components of counting circuit 67 may be represented by one or more other logic operand symbols such as AND gates, NAND gates, OR gates, XOR gates, or the like.

With reference to FIG. 1, output stage 108 is array of pass transistors that combine the count from counter 104 and counter 106 to assert the set bit count at output node 110.

Output stage 108 provides an inverse logic output so that the output node of concern is driven low. In more detail, output stage 108 asserts output node 111 when the input vector contains zero set bits, output node 113 is asserted when the input vector contains one set bit, output node 115 is asserted when the input vector contains two set bits, output node 117 is asserted when the input vector contains three set bits, and output node 119 is asserted when the input factor contains four set bits. One skilled in the art will appreciate that the correlation of the selected output node assignment to the number of set bits in the input vector may be reordered to be in the opposite order or placed in a random order. Also, one skilled in the art will appreciate that additional output nodes may be added to accommodate an input factor containing more than four bits.

Output stage 108 is an array of NMOS transistors having their gates controlled by the output of counter 106, their drains in circuit with the output of counter 104, and their sources in circuit with output 110. In operation, NMOS transistor 84A has its drain in circuit with the output node 31 of dynamic circuit 30, the drain of NMOS transistor 84D, the drain of NMOS transistor 84G, its gate in circuit with the output of NOR gate 68, its source in circuit with the drain of the PMOS pre-charge transistor 74A and in circuit with output node 111. NMOS transistor 84D has its gate in circuit with the output of counter circuit 67, its source in circuit with the drain of PMOS pre-charge transistor 74B, output node 113 and the source of NMOS transistor 84B. NMOS transistor 84G has its drain in circuit with the output node 31 of dynamic circuit 30, its gate in circuit with the output of NOR gate 72, its source in circuit with the drain of PMOS pre-charge transistor 74C, output node 115, the source of NMOS transistor 84E and the source of NMOS transistor 84C. The drain of NMOS transistor 84B is in circuit with the output node 45 of dynamic circuit 44, the drain of NMOS transistor 84E and the drain of NMOS transistor 84H, and its source in circuit with output nodel 13. NMOS transistor 84E has its source in circuit with output node 115, and its gate in circuit with the output of circuit 67. NMOS transistor 84H has its gate in circuit with NMOS transistor 84J, the gate of NMOS transistor 84G, and the output of NOR gate 72. NMOS transistor 84H has its source in circuit with the drain of the PMOS pre-charge transistor 74D, output node 117, and the source of NMOS transistor 84F. NMOS transistor 84J has its source in circuit with the drain of PMOS pre-charge transistor 74E, and output nodel 19. NMOS transistors 84C, 84F, and 84J each have their source in circuit with the output node 57 of dynamic circuit 56.

Output nodes 111, 113, 115, 117, and 119, each have an associated keeper circuit 21D, 21E, 21F, 21G, and 21H, that help maintain the desired state of the output by preventing false assertions due to leakage current in one or more of the transistors in the array. Keeper circuits 21D, 21E, 21F, 21G, and 21H, each have a single inverter gate and a single pre-charge transistor that have its inverter input tied to one of the output nodes of output stage 108 and its output tied to the inverted gate of a PMOS transistor. The PMOS transistor has its source in circuit with a source asserting a high level logic signal and its drain in circuit with one of the output nodes of output stage 108. Inverter 20E and PMOS transistor 52D form keeper circuit 21D. Inverter 20F and PMOS transistor 52E form keeper circuit 21E. Inverter 20G and PMOS transistor 52F form keeper circuit 21F. Inverter 20H and PMOS transistor 52G form keeper circuit 21G. Inverter 20J and PMOS transistor 52J form keeper circuit 21H.

Additionally, output node 111, 113, 115, 117 and 119 each have an associated pre-charge PMOS transistor 74A, 74B, 74C, 74D and 74E that pre-charges each of the output nodes 111, 113, 115, 117 and 119, to a known state when the clock pulse at input node 18 is at a high logic level. Each of the pre-charge transistors 74A, 74B, 74C, 74D and 74E have their source in circuit with a voltage source asserting a high level logic signal, and their inverted gate in circuit with the output of inverter 20A. Transistor 74A has its drain in circuit with output node 111, transistor 74B has its drain in circuit with output nodel 13, transistor 74C has its drain in circuit with output node 115, transistor 74D has its drain in circuit with output node 117, and transistor 74E has its drain in circuit with output node 119.

Figure 3:
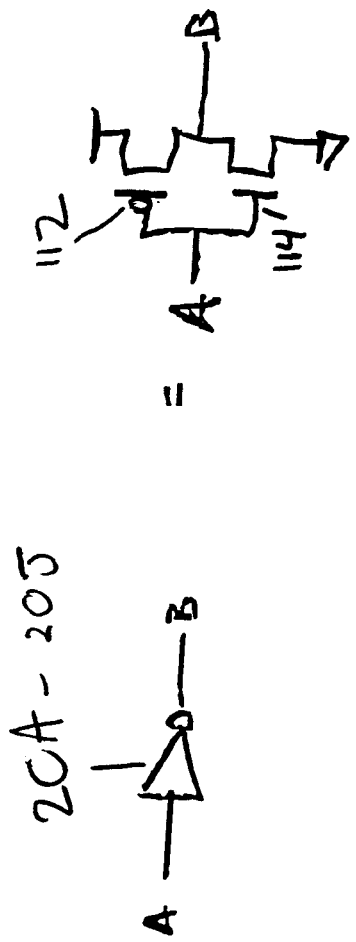
FIG. 3 depicts inverter gate 20A to 20J of FIG. 2 in more detail.

FIG. 3 is a more detailed illustration of inverter 20A through 20J. The A signal is tied to the inverted gate of PMOS transistor 112 and to the gate of NMOS transistor 114. The source of transistor 112 is tied to a voltage source supplying a voltage signal at a high logic level and its drain tied to the drain of transistor 114 and output B. Transistor 114 has its source connected to ground.

Figure 4:
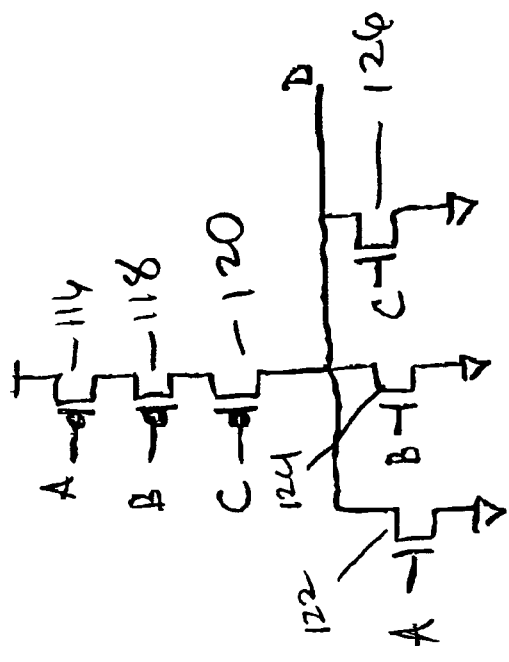
FIG. 4 depicts NOR gates 68 and 72 of FIG. 2 in more detail.
Figure 4:

FIG. 4 depicts NOR gates 68 and 72 in more detail. The A input is tied to the gate of NMOS transistor 122 and to the inverted gate of PMOS transistor 116. Input B is tied to the gate of NMOS transistor 124 and to the inverted gate of PMOS transistor 118. The C input is tied to the gate of NMOS transistor 126 and the inverted gate of PMOS transistor 120. Output signal D is tied to the drain of PMOS transistor 120 and to the drain of NMOS transistors 122, 124, and 126. PMOS transistor 116 has its source in circuit with a voltage source supplying a signal at a high logic level and its drain in circuit with the drain of PMOS transistor 118. PMOS transistor 118 has its drain in circuit with the source of PMOS transistor 120. NMOS transistors 122, 124, 126, all have their sources tied to ground One skilled in the art will appreciate that the discrete elements that perform the logical of NOR gate 68 and 72 are merely illustrative and that the discrete elements may be configured in a number of alternative manners and still perform a logical NOR operation.

Figure 5:
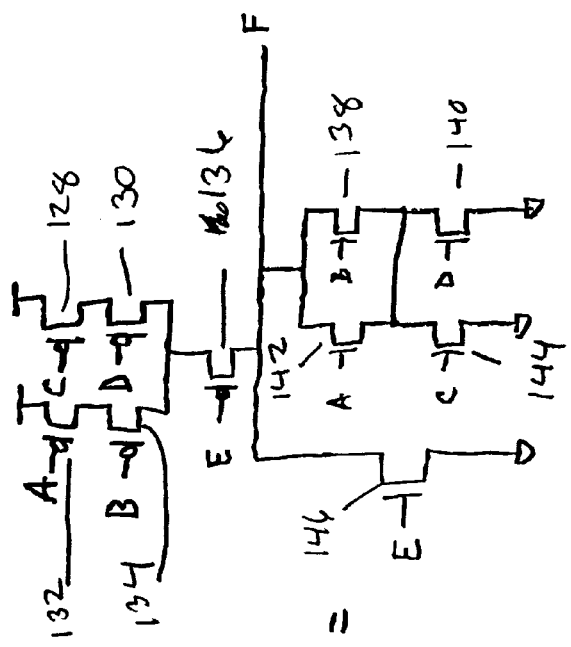
FIG. 5 depicts circuit 67 of FIG. 2 in more detail.
Figure 5:
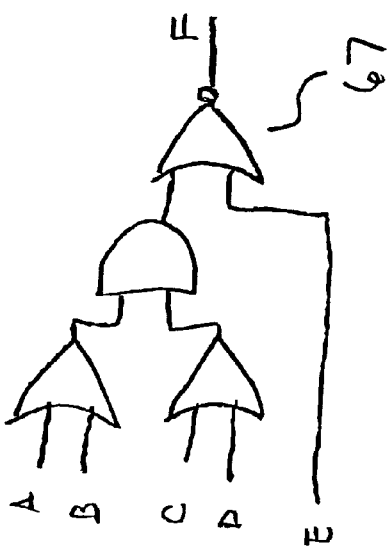

FIG. 5 depicts counter circuit 67 in more detail. Input A is tied to the inverted gate of PMOS transistor 132 and to the gate of NMOS transistor 142. Input B is tied to the inverted gate of PMOS transistor 134 and to the gate of NMOS transistor 138. Input C is tied to the inverted gate of PMOS transistor 128 and to the gate of NMOS transistor 144. Input D is tied to the inverted gate of PMOS transistor 130 and to the gate of NMOS transistor 140. Input E is tied to the inverted gate of PMOS transistor 136 and to the gate of NMOS transistor 146. Output F is tied to the drain of NMOS transistor 146, the drain of NMOS transistors 142 and 138, and the drain of PMOS transistor 136. PMOS transistor 132 has its source in circuit with a voltage source supplying a high level logic signal, and its drain in circuit with the source of PMOS transistor 134. PMOS transistor 134 has its drain in circuit with the source of PMOS transistor 136. PMOS transistor 128 has its source in circuit with a voltage source supplying a high level logic signal, and its drain in circuit with the source of PMOS transistor 130. PMOS transistor 130 has its drain in circuit with the drain of PMOS transistor 134 and the source of PMOS transistor 136. NMOS transistor 146 has its source in circuit with ground. NMOS transistor 142 has its drain in circuit with the drain of NMOS transistor 138. NMOS transistor 142 has its source in circuit with the drain of NMOS transistor 144, the drain of NMOS transistor 140, and the source of NMOS transistor 138. NMOS transistor 144 has its source in circuit with ground. NMOS transistor 140 has its source in circuit with ground.

While the present invention has been described with reference to a preferred embodiment thereof, those skilled in the art will appreciate that various changes in form and detail may be made without departing from the intended scope of the present invention as defined in the pending claims. For example, a different number of input nodes and output nodes may be embodied to practice an illustrative embodiment of the present invention, to accommodate an input vector containing more than four bits. Moreover, different varieties of electrical components may be used to practice the present invention. Thus, bipolar transistors may be used rather than FETs. Further, the low level logic signals refer to a voltage level that is approximately zero volts and the high level logic signals refer to a voltage level that is at least approximately one volt.

What is claimed is:

1. A semiconductor device for counting set bits in an input vector comprising:

a first input stage performing a count of a first set of bits in the input vector in one gate delay;

a second input stage performing a count of a second set of bits in the input vector in one gate delay; and an output stage multiplexing the count from the first input stage and the count from the second input stage to assert an output representative of a count of set bits in the input vector in less than one full gate delay.

2. The semiconductor device of claim 1, wherein the first input stage comprises:

a dynamic logic assembly performing a population count of the first set of bits in the input vector, and asserting a count to one or more nodes.

3. The semiconductor device of claim 1, wherein the second input stage comprises:

a static logic assembly performing a population count of the second set of bits in the input vector, and asserting the population count to one or more nodes.

4. The semiconductor device claim 1, wherein the output stage comprises:

a plurality of pass transistors forming an array between a first plurality of output nodes of the first input stage and a second plurality of output nodes of the second input stage.

5. The semiconductor device of claim 1, wherein the output stage asserts the total count of set bits in inverse logic.

6. The semiconductor device of claim 1, wherein the output stage asserts the total count of set bits in positive logic.

7. The semiconductor device of claim 1, wherein the output stage includes at least one output node and wherein the output stage further comprises a precharge circuit for each of the output nodes of the output stage.

8. The semiconductor device of claim 1, wherein the output stage includes at least one output node and wherein the output stage further comprises a keeper circuit for each of the output nodes of the output stage.

9. The semiconductor device of claim 2, further comprising one keeper circuit for each of the one or more nodes.

10. A counter for performing a population count in less than three full gate delays, comprising:

a first plurality of input nodes, each corresponding to an input bit and a complement of the input bit from a first bit sequence of an input vector;

a second plurality of input nodes each corresponding to an input bit and a complement of the input bit from a second bit sequence of the input vector;

a first counting circuit for counting set bits in the first bit sequence of the input vector in one gate delay, wherein the first counting circuit asserts a first count to a first plurality of output nodes;

a second counting circuit for counting set bits in the second bit sequence of the input vector in one gate delay, wherein the second counting circuit asserts a second count to a second plurality of output nodes;

an array of pass gates in circuit with the first plurality of output nodes and the second plurality of output nodes to combine the first count from the first counter circuit and the second count from the second counter circuit to assert a total count of set bits in the input vector at a third plurality of output nodes in less than a full gate delay.

11. The counter of claim 10, further comprising a keeper circuit on each of the said first plurality of output nodes and on each of the said third plurality of output nodes.

12. The counter of claim 10, further comprising a plurality of precharger circuits for precharging the third plurality of output nodes.

13. The counter of claim 10 wherein the first counter circuit comprises:

a first dynamic logic assembly adapted for indicating that no bits are set in the first bit sequence of the input vector;

a second dynamic logic assembly adapted for indicating that at least one bit is set in the first bit sequence; and a third dynamic logic assembly adapted for indicating that all bits in the first bit sequence are set.

14. The counter of claim 10, wherein the second counter circuit comprises:

a first static logic assembly adapted for indicating that no bits are set in the second bit sequence of the input vector;

a second static logic assembly adapted for indicating that at least one bit is set in the second bit sequence; and a third static logic assembly adapted for indicating that all bits in the second bit sequence are set.

15. A method of counting set bits in an input vector, the method, comprising the steps of:

performing a count of set bits in a first set of bits in the input vector using dynamic logic in one gate delay;

performing a count of set bits in a second set of bits in the input vector in one gate delay; and asserting a total count of set bits in less than one gate delay.

16. The method of claim 15, further comprising the step of:

precharging one or more output nodes.

17. The method of claim 15, further comprising the step of:

preventing false assertions on one or more output nodes.

18. The method of claim 15, wherein the total count of set bits is asserted in inverse logic.

19. The method of claim 15, wherein the total count of set bits is asserted in positive logic.

20. The method of claim 15, wherein the count of the first set of bits in the input vector is performed using dynamic logic in one gate delay.

* * * * *